(12) United States Patent
Hoff et al.

(10) Patent No.: US 9,093,847 B2
(45) Date of Patent: Jul. 28, 2015

(54) TEMPERATURE CONTROLLED PARALLEL BALANCING

(75) Inventors: C. Michael Hoff, Boxborough, MA (US); David Colucci, Lynnfield, MA (US); Tom De Lucia, Milford, MA (US); Bud Collins, Berlin, MA (US)

(73) Assignee: NEC Energy Solutions, Inc., Westborough, MA (US)

( * ) Notice: Subject to any disclaimer, the term of this patent is extended or adjusted under 35 U.S.C. 154(b) by 521 days.

(21) Appl. No.: 13/578,169

(22) PCT Filed: Feb. 14, 2011

(86) PCT No.: PCT/US2011/024758
§ 371 (c)(1),
(2), (4) Date: Sep. 18, 2012

(87) PCT Pub. No.: WO2011/100686
PCT Pub. Date: Aug. 18, 2011

(65) Prior Publication Data
US 2013/0009602 A1 Jan. 10, 2013

Related U.S. Application Data

(60) Provisional application No. 61/304,132, filed on Feb. 12, 2010.

(51) Int. Cl.
*H02J 7/00* (2006.01)
*H02J 7/04* (2006.01)

(52) U.S. Cl.
CPC ............. *H02J 7/0021* (2013.01); *H02J 7/047* (2013.01)

(58) Field of Classification Search
CPC ... H02J 7/0021; H02J 7/0047; B60L 11/1874; B60L 11/1875
See application file for complete search history.

*Primary Examiner* — Vuthe Siek
*Assistant Examiner* — Aric Lin
(74) *Attorney, Agent, or Firm* — Chapin IP Law, LLC

(57) ABSTRACT

A method of controlling current in a parallel battery systems includes providing at least two parallel connected batteries, each said battery having an internal resistance and dissipating heat while operating; during operation, measuring at least the temperature and current of each individual battery; and providing instructions to a temperature control system having a temperature control module coupled with each said battery for individually cooling each said battery to adjust temperature of at least one battery in order to maintain the current at a target value.

17 Claims, 12 Drawing Sheets

TEMPERATURE CONTROLLED PARALLEL BALANCING

CROSS REFERENCE TO RELATED APPLICATIONS

This application claims the benefit of U.S. Provisional Patent Application No. 61/304,132 filed Feb. 12, 2010, which is incorporated by reference its entirety.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

This subject matter relates to a system of multiple parallel-connected batteries and a method of controlling current values of each battery within the parallel battery system and the total current value of the entire parallel battery system.

BACKGROUND

For reasons of state-of-charge (SOC) management, system efficiency, and state of health management (SOH), it may be advantageous to adjust the current in an individual battery to be higher, lower or the same as other parallel-connected batteries.

One method of controlling current between parallel batteries is by controlling a switching device connected between each of the batteries and the other parallel connected batteries. Current control involving the hard switching of batteries has quite a few disadvantages. Primarily, the current into and out of the battery cannot be finely controlled. The current is either ON or OFF, not anywhere in between. For example, if the system detects current into one of the parallel batteries as being too high, the only mechanism for control is to open a series switch to turn OFF the current. Another problem with this method is that whenever a parallel battery is disconnected from the others, its voltage will be different from that of the others. When a reconnection is made, the difference in voltage will force current in or out of the connecting batteries. If the difference is large enough, excessive and possibly damaging current inrushes can occur, thus damaging the battery, switching devices or other interconnecting hardware.

Other methods of controlling the current coming in and out of a battery involve a more active means such as controlling a regulator which actively controls the power flow in and out of each battery. The use of a regulator to control the current in and out of each of the parallel batteries addresses the discontinuity issues noted above; however, its disadvantages are high cost, weight, size and system complexity and lower reliability. The regulator often does employ switching devices, which switch at a relatively high frequency and controlled duty cycle and use magnetic or capacitive components to smooth out the effects of the hard switching. The net result is that the current into or out of each battery is smoothly controlled between the ranges of completely ON and completely OFF. The devices required to perform the switching, smoothing and controlling actions in these regulators have cost, size and complexity that is proportional to their power handling capability. This means that the regulators are often a significant portion of the physical and cost budget of the overall energy storage system. In addition, the added complexity and increased parts count represents a liability in reliability over systems without such hardware.

Still another method employs a series resistor between the batteries and the connecting bus, with a value high enough so that it controls the current into the batteries and controls the ratio of current into each. The use of simple resistive elements to control the current into parallel batteries is a simpler mechanism and lower cost and size than using a regulator for continuous current control, but its disadvantage is that the resistors waste a lot of useful energy while controlling the current going into each of the batteries. The energy wasted in each of the resistors is proportional to the square of the current going through them. This energy is permanently lost in the form of heat which must in turn be dissipated safely within the system to the environment. This lost energy reduces the overall storage system efficiency and the heat can reduce the overall system reliability if it contributes to the warming of the batteries and other devices. In addition, the loss of energy reduces the charge time for each of the batteries for a given size of charging system.

Another approach involves controlling the current using magnetic current controlling devices called Saturable Reactors. These devices can be externally controlled to limit the current through each of the parallel strings. The use of magnetic components to control the power into and out of the parallel batteries solves the problem of lost energy into each of the batteries and extended charge time during normal conditions, i.e. balanced operation. In addition, the control mechanisms can potentially be simpler than that of a regulator and still control the power better than a simple on-off switch. However, the magnetic devices must be sized large enough to accommodate worse case current handling. This adds to the cost and size of the overall system.

SUMMARY

Systems and methods are described to provide control of current values in parallel-connected batteries by controlling the temperature of each of the batteries independently. The use of temperature to control the shared current of paralleled batteries is provided.

A system and method for controlling current using temperature control of the component batteries includes two or more parallel-connected batteries that exhibit internal resistance and dissipate heat while discharging and charging. The resistance is monotonically variable with respect to the battery's temperature within the normal operating temperature range of the batteries. The system also includes a cooling system which can draw the heat generated in the batteries away from the batteries, in which the rate of heat transfer from each of the batteries can be independently controlled.

In one aspect, a system for control of current in a parallel battery system includes at least two parallel connected batteries, each said battery having an internal resistance and dissipating heat while charging and discharging; a temperature controller having a temperature control module coupled with each said battery, the temperature control modules capable of independent operation for individually adjusting the temperature of each said battery; and a system controller for receiving information from each said battery related to condition and performance of each said battery and for providing an output signal to each of the temperature control modules to independently adjust the temperature of each said battery.

In one or more embodiments, the temperature control system is selected from the group consisting of air cooling, cooling fluid, thermoelectric cooling, air heating, a heating fluid, and thermoelectric heating.

In any of the preceding embodiments, the system controller is selected from the group consisting of a programmable digital device such as a microprocessor, field programmable gate array (FPGA) or other similar device.

In any of the preceding embodiments, the system can be a thermostat. In any of the preceding embodiments, the system controller can be selected to receive information selected from the group consisting of voltage, current, temperature and combinations thereof. In any of the preceding embodiments, the system further includes a tool for evaluating a state of the battery system.

In another aspect, a method of controlling current in a parallel battery system includes providing at least two parallel connected batteries, each said battery having an internal resistance and dissipating heat while operating; during operation, measuring at least the temperature and current of each individual battery; and providing instructions to a temperature control system having a temperature control module coupled with each said battery for individually heating or cooling each said battery to adjust temperature of at least one battery in order to maintain the current at a target value.

In one or more embodiments, the method further includes comparing the measured values of each said battery against a target value, said target value related to the state and/or performance of each said battery.

In any of the preceding embodiments, the state of the battery is selected from the group of energy, which is correlated to ampere hours (AH), state of health (SOH) and state of charge (SOC).

In any of the preceding embodiments, increasing dissipation of heat or lowering the temperature of the battery increases current to the battery, or decreasing the dissipation of heat or raising the temperature of the battery decreases current to the battery.

In any of the preceding embodiments, the temperature control system controls the amount of stored electric charge, i.e., storage capacity, measured in AH, of each of the parallel batteries to converge to each other, or the temperature control system forces the current of each of the batteries to be the same regardless of AH or other conditions, or the temperature control system forces the current in a particular battery to be a ratio of the other batteries' currents depending on what the known capacity of the controlled battery relative is to the rest of the system, or the temperature control system forces the SOC of each of the batteries to be the same with respect to each other, or the temperature control system reduces the charging and discharging of one of the batteries if its SOH is more dependent on the Watt hours (WH), i.e., energy, throughput than the other batteries, or increases the charging and discharging of one of the batteries if its SOH is less dependent on the WH throughput than the other batteries.

BRIEF DESCRIPTION OF THE INVENTION

The invention is described with reference to the drawing which is presented for the purpose of illustration only and is not intended to be limiting of the invention.

Figure 5:
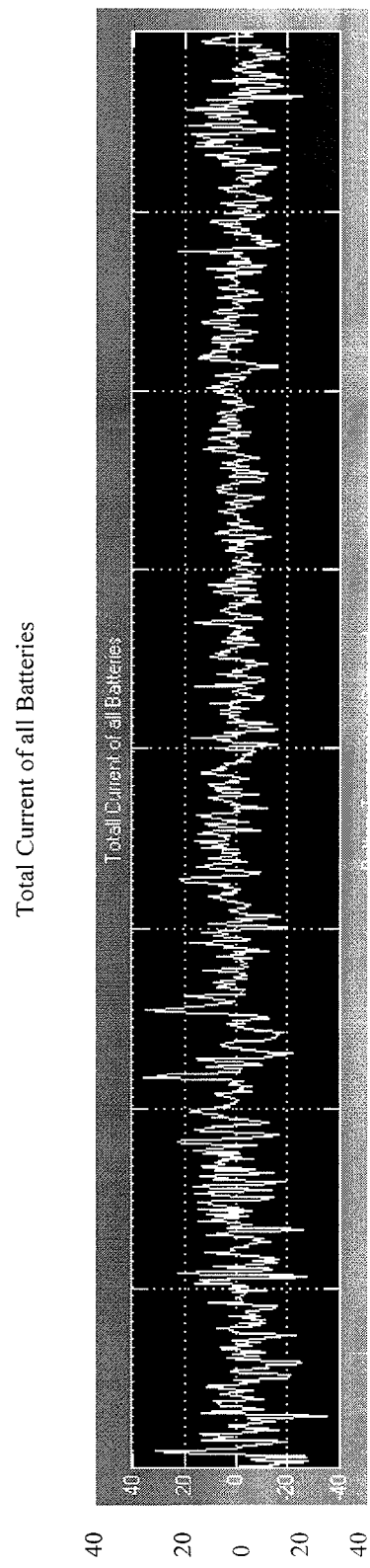
FIG. 5 is a plot of total current (charging and discharging) scaled for an exemplary 5 cells parallel system over a 22 hour period.
Figure 9:
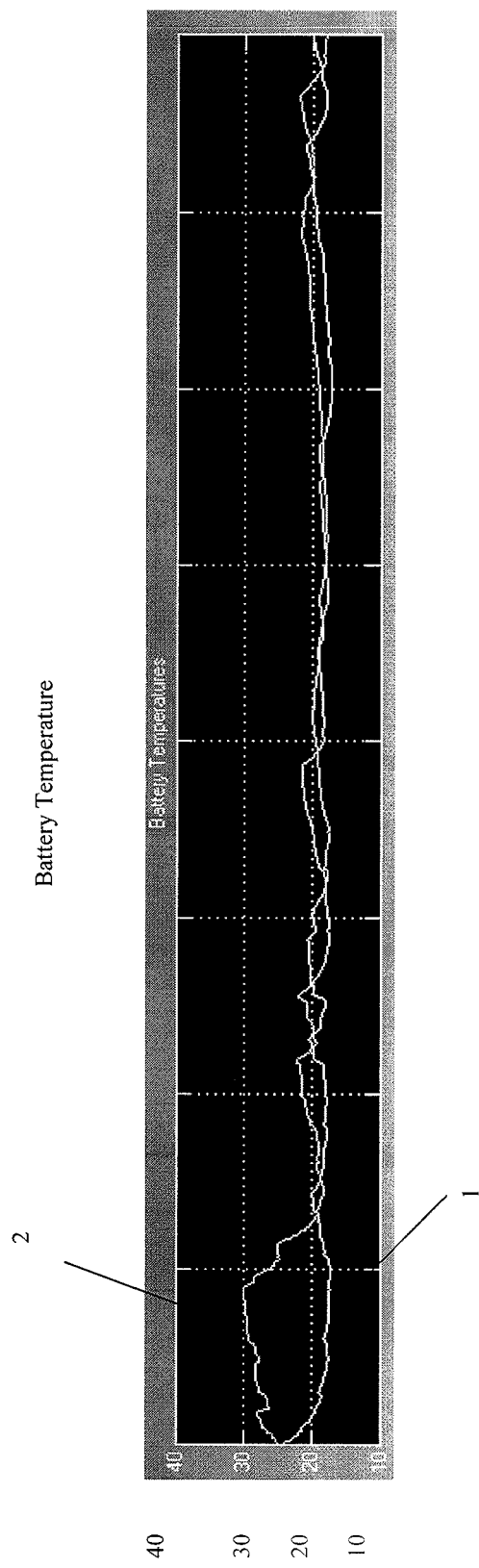

FIG. 9 is a plot of temperatures vs. time for the parallel batteries in the 5 battery system of FIG. 5 in which curve 1 represents the temperature profile for cell R1 with an initial 10% lower AH than Batteries 2 through 5 (represented by curve 2).

Figure 10:
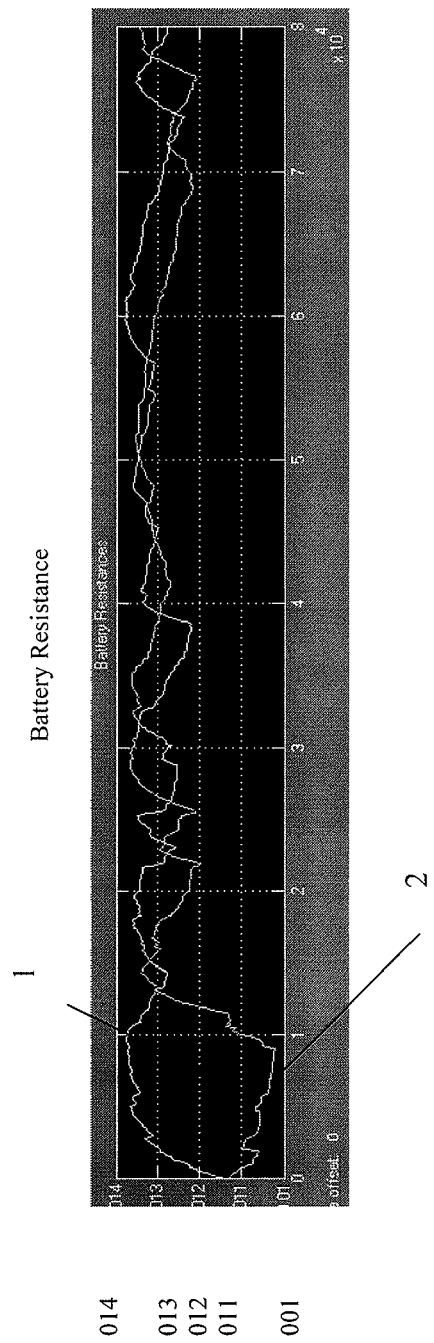

FIG. 10 is a plot of battery resistance vs. time for the example of FIG. 9.

Figure 11:
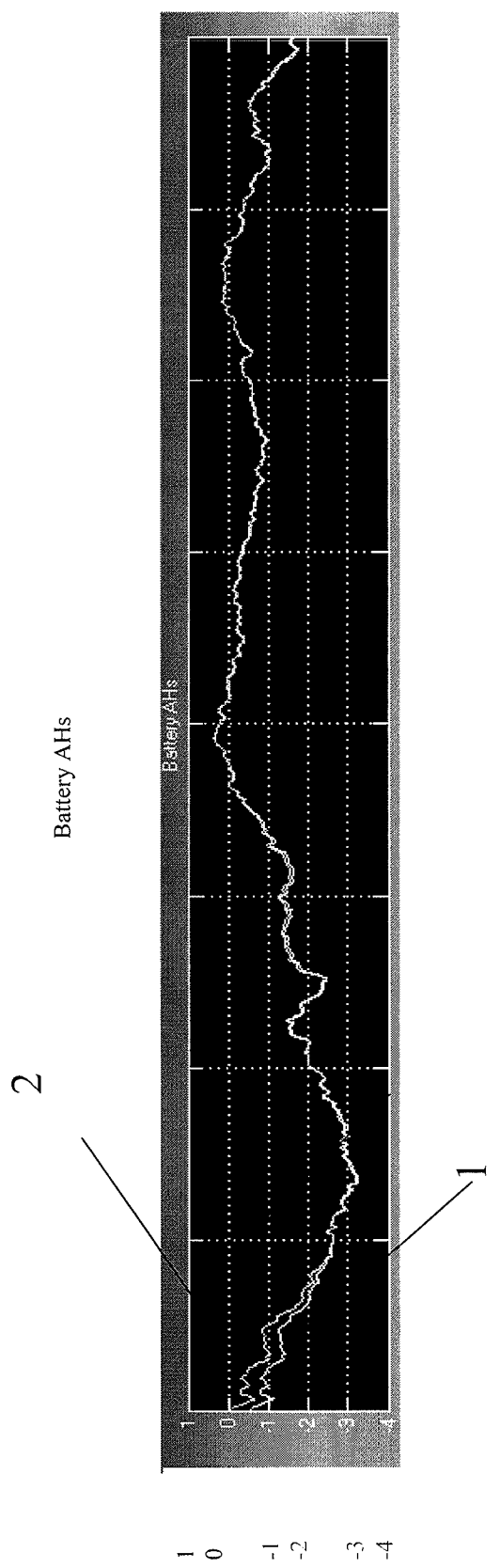

FIG. 11 is a plot of all batteries' AH vs. time for the example of FIG. 9.

Figure 12:
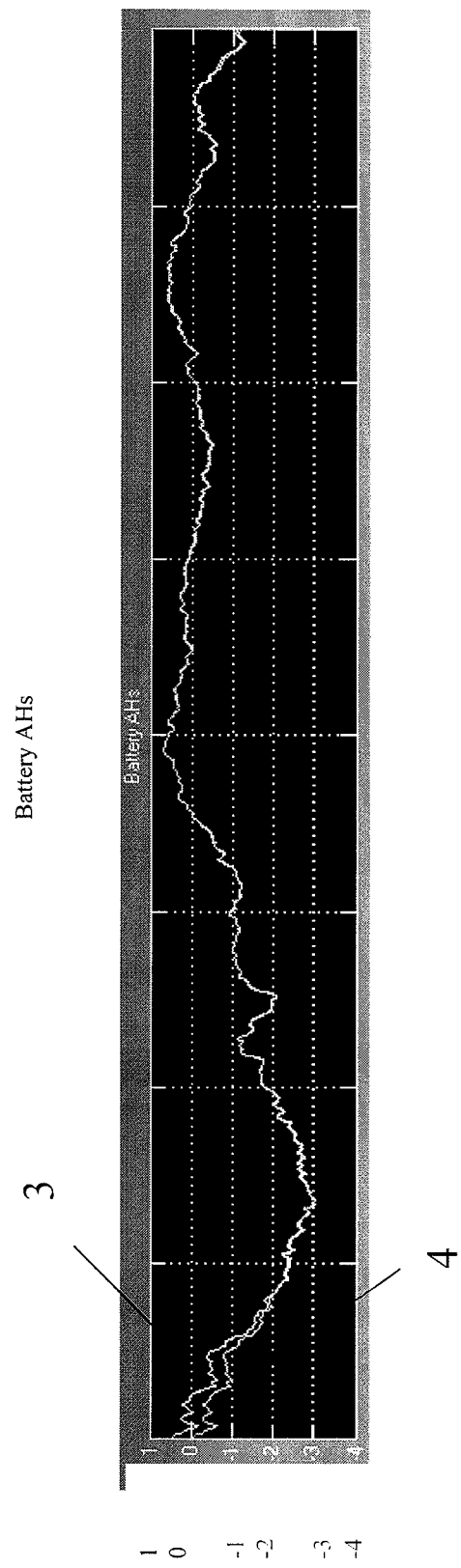

FIG. 12 is a plot of all Batteries' AH vs. time for the parallel batteries in the 5 battery system of FIG. 5 in which curve 3 represents the temperature profile for cell R1 with an initial 10% higher AH than Batteries 2 through 5 (represented by curve 4).

DETAILED DESCRIPTION

Temperature controlled parallel balancing of current in parallel-connected batteries takes advantage of the internal resistance of batteries being monotonically dependent on their temperatures. Depending on the type of battery, the internal resistance can increase or decrease with a change in the internal temperature of the battery. The battery internal resistance affects the current flow through the battery, since the current is dependent on the applied voltage on a common bus of the parallel battery system and the battery's own internal resistance. Thus, by raising or lowering the internal temperature of the battery, the current value of each battery and the current value of the entire parallel battery system can be adjusted upwards or downwards.

The system permits minor adjustments in the current going in and out of the individual parallel-connected batteries for the purposes of state of charge (SOC), state of health (SOH) and temperature management. Minor adjustments to current control provides small adjustments, e.g., about 10% of current or about 1% to about 20% of the total current. The system can be used in conjunction with conventional systems such as switches and regulators which provide major adjustments in the current.

By 'internal temperature' as used herein, it is meant as a measured quantity representative of the individual battery's internal temperature.

Figure 1:
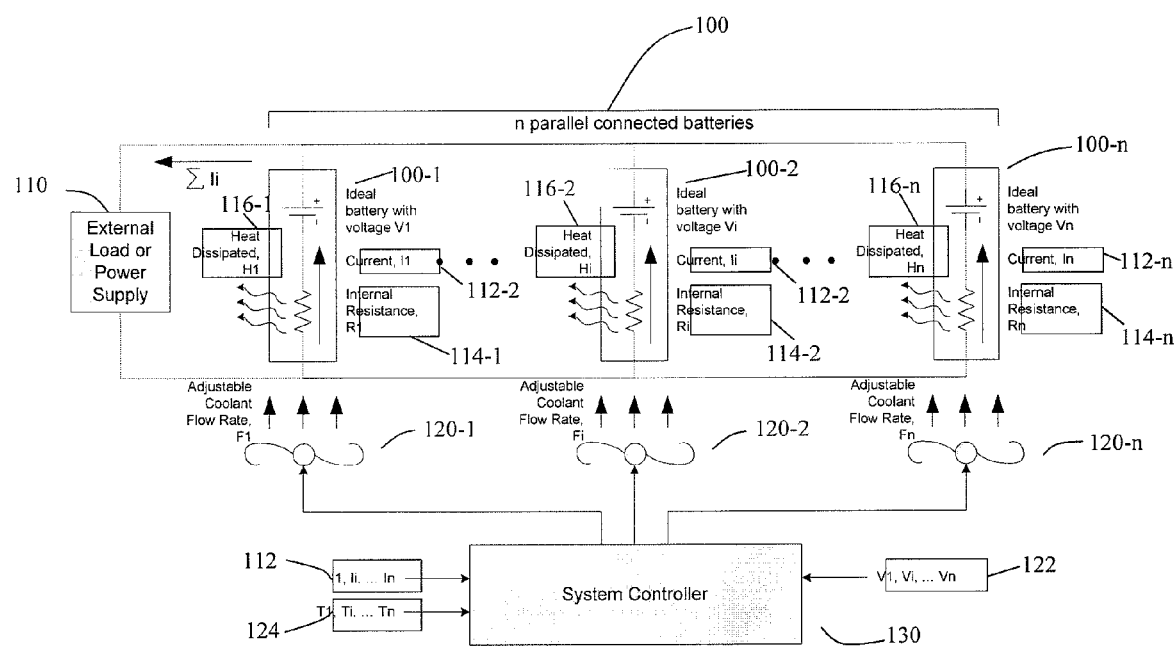
FIG. 1 is a generalized schematic of a current control system for n parallel batteries according to one or more embodiments.

An exemplary system is illustrated in FIG. 1 that includes an architecture of n parallel batteries, $100\text{-}1 \ldots 100\text{-}n$, each of which may include one or more batteries connected in series. Each of the n parallel batteries has a unique performance profile that is characterized by an internal resistance $R_1 \ldots R_n$ ($114\text{-}1 \ldots 114\text{-}n$), a current $I_1 \ldots I_n$ ($114\text{-}1 \ldots 114\text{-}n$), and heat dissipation $H_1 \ldots H_n$ ($116\text{-}1 \ldots 116\text{-}n$). FIG. 1 also shows an external load (for discharging conditions) or power supply (for charging conditions) 110 and individually operable temperature control units 120-1 . . . 120-n. Temperature control units 120-1 . . . 120-n provide cooling to their respective batteries 100-1 . . . 100-n and employ conventional cooling methods such as air cooling (air flow), water cooling (water flow) and thermoelectric cooling. The temperature control units 120-1 . . . 120-n are responsive to an output signal from system controller 130.

The system controller 130 receives data about the individual batteries 100-1 . . . 100-n in the form of Voltage $V_i$ 122, Current $I_i$ 112, and Temperature $T_i$ 124. From this information, the controller determines individual SOC, SOH and efficiency information about each battery and the whole system in aggregate. Tools for monitoring battery conditions and evaluating the overall state of the battery system are well known in the art and may be used for this purpose. Exemplary systems are offered by TI, O2 Micro, Linear Technologies, Maxim, Analog Devices, Intersil and others that can determine battery conditions based on the three basic sensory inputs and battery history.

Batteries employing the system and methods of control described herein can remain connected to the DC bus and minor adjustments can be made to each of the batteries' currents for the desired results. There is no requirement to connect or disconnect the batteries to and from the DC bus in order to control current. Current sharing is done by manipulating the internal resistance of the batteries, not by adding additional energy-consuming resistance to the current pathways. The additional resistance is much smaller and contributes a negligible addition to the total system losses.

The method and system is simple to implement and does not require significant amounts of physical hardware. In many cases, the only additional hardware is that required to control the existing cooling systems. There are no additional power consuming devices in the power path so that the overall efficiency of this system is much higher as a result.

Figure 2:
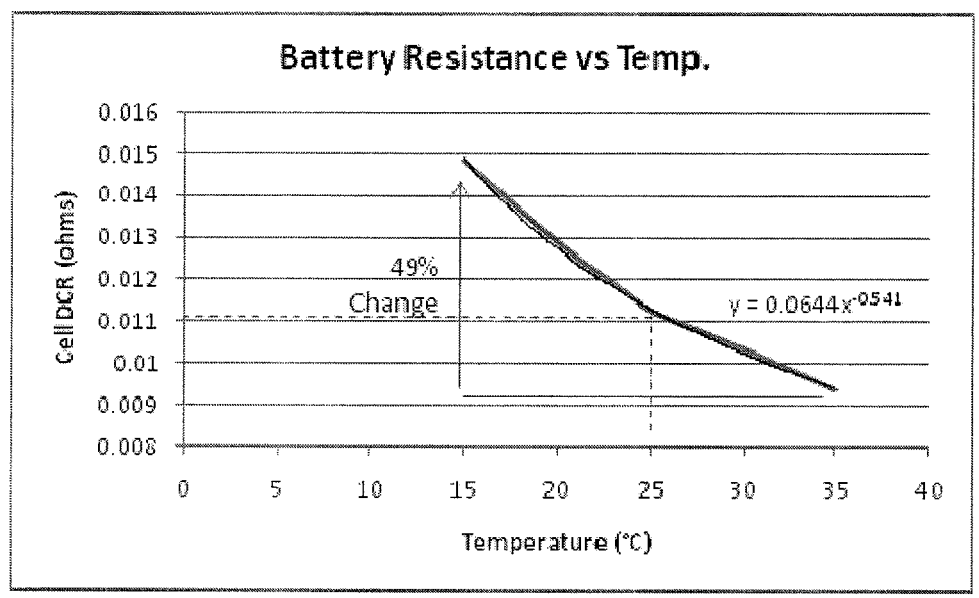
FIG. 2 is a plot of exemplary battery resistance vs. temperature according to one or more embodiments.

An exemplary battery system will help illustrate this method. In this system there are multiple parallel battery systems as shown in FIG. 1. The batteries' internal resistances are inversely proportional to their internal temperatures. In a typical electrochemical system, the propensity for the ions to move in and out of interstitial storage at the electrodes and through the electrolyte-saturated separator is dependent on the temperature. As is the case in most chemical interactions, a higher temperature will result in more activity. A higher propensity to move ions results in a lower amount of voltage required to move them. Therefore, the ratio of the voltage to ionic transfer (i.e., current) is smaller. This ratio is the resistance of the cell. At a nominal temperature of 25° C., a change of temperature of at least ±10° C. will result in a change of resistance of ±25% as shown in FIG. 2. While internal resistance typically decreases with increasing temperature, it is also possible for resistance to increase with increasing temperature by appropriate selection of battery components. For example, metallic conductors can demonstrate increased internal resistivity at higher temperatures. In a metallic conductor, the "electronic" conductivity is inversely proportional to temperature. At higher temperatures, the electrons bounce around from atom to atom in a more frenzied manner. This atomic-level chaos actually impedes their progress through the metal. Battery system resistances will scale with respect to their parallel and series arrangements of cells, as is commonly known by those skilled in the art.

Figure 3:
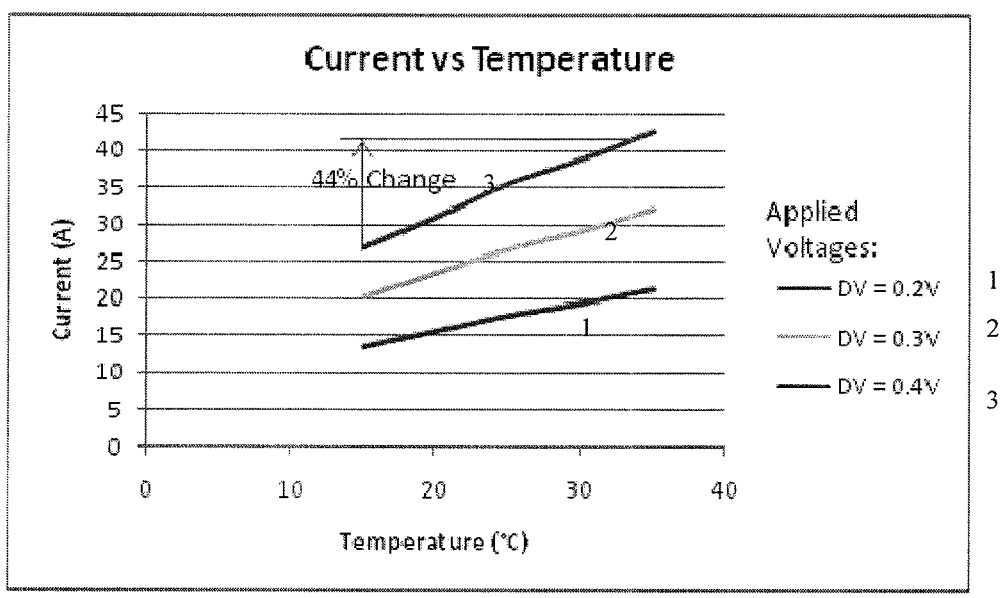
FIG. 3 is a plot of exemplary current vs. temperature for a cell at different applied voltages according to one or more embodiments.

When the resistance varies in a battery, the discharge and charge current will vary as well. For example, in the example system, a variation of ±10° C. around 25° C., the discharge and charge currents of the battery will vary by as much as ±22% as shown in FIG. 3 for a applied voltage (DV) of 0.4V, 0.3V and 2V. While the current increases overall with increasing voltage, the rate of increase at each voltage, i.e., the slope of the curve, remains fairly constant.

Figure 4:
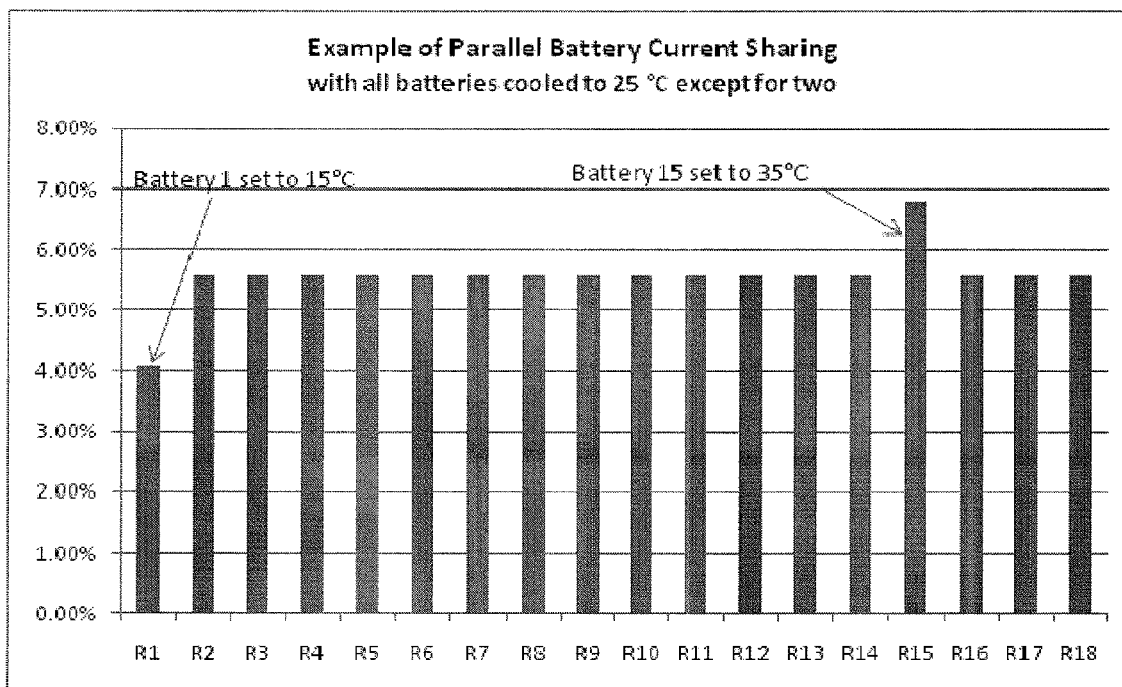
FIG. 4 is a bar graph of current (designated as % current sharing) for each of an exemplary 18 individual batteries connected together in parallel with all batteries cooled to 25° C. except for two batteries cooled to 15° C. and heated to 35° C., respectively, and illustrating the effect of difference in internal battery temperature on current sharing.
Figure 7:
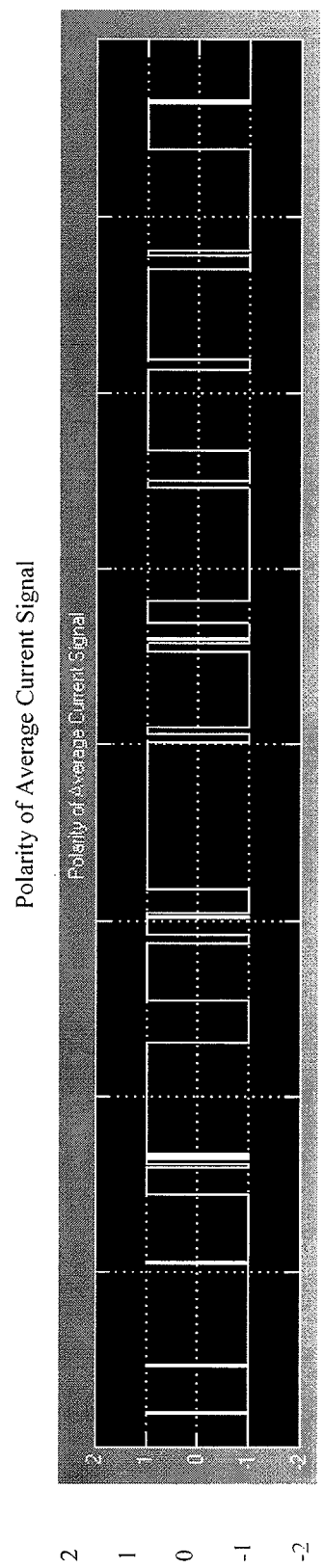
FIG. 7 is a binary I-Polarity plot of the total current curve in FIG. 6, in which a charging state is indicated as "1" and a discharging state is indicated as "−1".

In order to demonstrate temperature-controlled current balancing in a parallel-connected battery system, a battery system including 18 parallel-connected batteries is considered. FIG. 4 is a plot of the percent current shared by each of 18 batteries in an 18 battery parallel system, which is maintained at a nominal temperature of 25° C. In an ideal system, each battery shares the same current load; however, one cell is cooled to 15° C. and one cell is heated to 35° C. as is shown in FIG. 7, current sharing is unequal. The typical current sharing for a cell at 25° C. is about 5.55%. The temperature of cell R1 is 15° C. and therefore the percent current carried by the cell is less than the system average, e.g., about 4%, and the temperature of cell R15 is 35° C. and therefore the current carried by the cell is more than the system average, e.g., about 7.8%. Thus, for this system, the temperature of cells R1 and R15 differ from the average cell temperature by about 15° C. Assuming an approximately similar internal resistance for each battery, a temperature increase of 10° C. for Cell R1 and a temperature decrease of 10° C. for Cell R1 would balance the system. The system is provided by way of example only. Systems with different numbers of batteries and other system characteristics are contemplated. In addition, the system and method are described with regards to controlling energy balance in the cells, control of other cell characteristics are contemplated. In one or more embodiments, the temperature control system controls the AH of each of the parallel batteries to converge to each other. In one or more embodiments, the temperature control system forces the current of each of the batteries to be the same regardless of AH or other conditions.

In one or more embodiments, the temperature control system forces the current in a particular battery to be a ratio of the other batteries' currents depending on what the known capacity of the controlled battery is relative to the rest of the system. For example, one could shift larger current to a lithium ion battery and only begin to use a lead acid battery when the lithium battery is depleted. In one or more embodiments, the temperature control system forces the SOC of each of the batteries to be the same with respect to each other. In one or more embodiments, the temperature control system forces the SOC, e.g., about 35-50% SOC, of each of the batteries to a point that is beneficial for its SOH or efficiency. In other embodiments, the temperature control system reduces the charging and discharging of one of the batteries if its SOH is more dependent on the WH throughput than the other batteries, or increases the charging and discharging of one of the batteries if its SOH is less dependent on the WH throughput than the other batteries.

Another embodiment is to control the temperature of each of the batteries independently to positively affect their individual efficiency, SOH, or performance.

In one exemplary system, a goal is to keep the energy level (measured in AH) in each of the batteries identical to each other. If one of the batteries has a higher AH than the others, a way to make it match that of the others, is to discharge more current than the others when all of them are discharging together into a load. Another way is to accept less current than the others when all of them are being charged by an external power supply. A third way is to employ both of these methods during a series of charges and discharges over a period of time.

Figure 6:
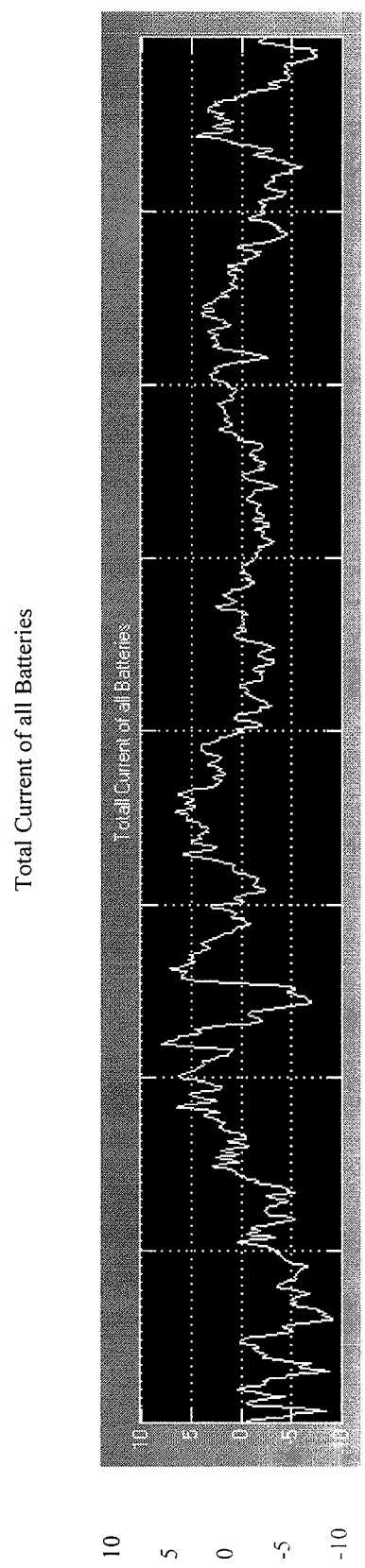
FIG. 6 is a plot of the 15-minute rolling average of the total current (charging and discharging) scaled for an exemplary 5 cells parallel system over a 22 hour period.

Consider a battery system that is employed to charge and discharge, multiple and variable times at variable rates depending on a desired result. The total current flow into and out of the cells with time can be very complex. FIG. 5 is a plot of current vs. time and shows the total battery current going in and out of all of a collection of parallel batteries over a period of 22 hours based on data taken from a real-life example of battery current. The magnitude of current shown is sized for five parallel cells. The data are used to demonstrate the effect of temperature control on battery performance, such as energy (AH), current, SOC or SOH. The subsequent graphs of reactions of the proposed system to this data are simulated. Although this current seems random, there are extended periods of time when the average current is either mostly positive (charging), or mostly negative (discharging). A signal that represents a 15 minute average of this demanded current is helpful to see these trends. FIG. 6 is an expanded curve that shows the signal representing a 15 minute average current. A signal above '0' on the y-axis is time during which the system is charging, while a signal below '0' is time during which the system is discharging.

This signal is then used to generate a binary signal "I-Polarity" that represents the polarity of the demanded current. In this binary system, the cell has a value of "−1" when in a discharging state; a value of "1" when in a charging state and crosses the '0' line when switching between the two. FIG. 7 illustrates the bipolar I-polarity graph for the current plot of FIG. 6. There are significant periods of time when the average current demand is either positive or negative. The longer these periods of time are, with respect to the thermal time constant of the batteries, the better the system can affect the resulting AH balance by manipulating the batteries' temperatures. That is, in order to be able to change the temperature during any one of these periods of charging or discharging, the thermal time constant of the batteries needs to be smaller than the length of that time period.

Figure 8:
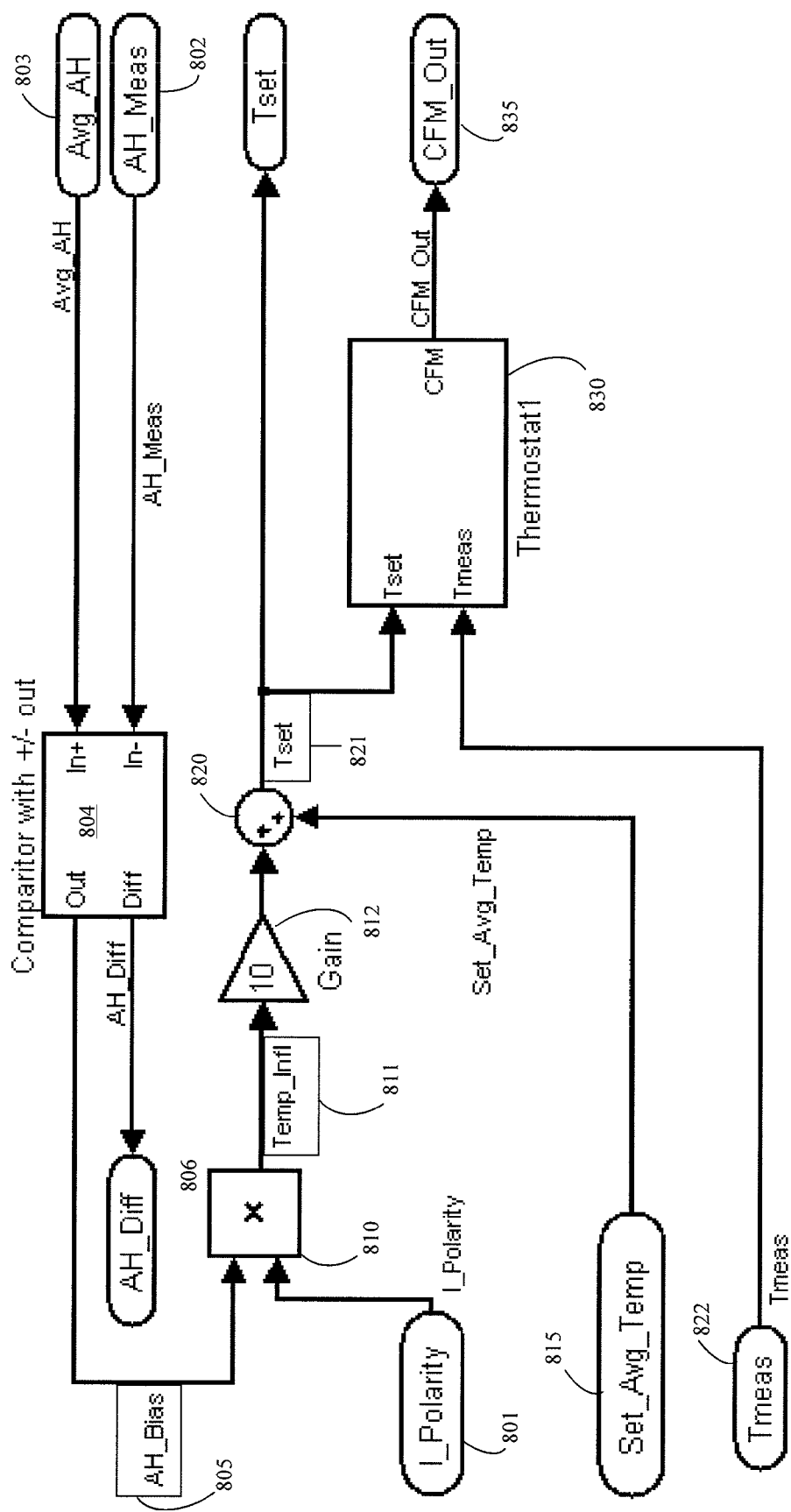
FIG. 8 is a control diagram showing how the difference in AH measured to the group's average AH influences the cooling demand signal of the individual batteries.

A control diagram showing a process for temperature control of each battery in a parallel battery system such as exemplified in FIGS. 5-7 is shown in FIG. 8.

An I-polarity curve is generated for each battery in the system as described above, indicated in FIG. 8 as 801. Each individual battery AH of an n battery parallel system, "AH_Meas," 802, e.g., 802-1 . . . 802-$n$, is determined. AH_Meas 802 is input along with the parallel battery group average AH, "AH_Ave" 803 into a comparator 804. Comparator 804 compares the values for each AH_Meas 802 against AH_Ave 803. A value "AH_Diff" 806 is generated (and optionally displayed) that represents the difference between each comparison pair. A signal for each battery, "AH_Bias" 805, e.g., 805-1 . . . 805-$n$ is generated, which represents the desired direction in which each battery's individual AH needs to be steered with respect to the others in order to achieve a desired goal. A positive number represents a desire to move the individual AH higher than it is currently.

Two signals, I-Polarity 801 and AH-Bias 805 are combined using multiplication at multiplier 810 to result in a signal, "Temp_Infl" 811, which indicates the need to influence the battery temperature up or down, e.g., it provides the sign of the signal. Signal 811 is adjusted, e.g., multiplied, by a fixed gain 812 to influence the magnitude of the temperature adjustment that is reasonable. Exemplary gain values can range from about one to about twenty. In the example set forth in FIG. 4, the temperature is desired to be moved ±10° C. around a center point, so a gain of 10 is applied to the temperature influence signal. Finally, to set the center point around which the temperature is adjusted, this gained signal is added to an offset signal "Set_Avg_Temp" 815 at 820 to obtain the target temperature set point Tset 821. Temperature set point, "Tset" 821 and the measured temperature of the battery Tmeas 822 are input to a thermostat function block 830 which drives a mechanism to increase or decrease cooling to achieve a desired battery temperature. For example in this system, the thermostat controls the CFM signal 835 which controls the cooling fan speed. FIG. 8 shows the interconnection of the above mentioned signals. Each battery has its own control function shown above in order to independently control the temperature of each of the batteries in response to its relative AH. In turn, the temperature of each battery can be independently controlled in order to effect any one of a desired battery parameter.

To test the model, a five parallel battery system with one of the batteries having AH about 10% lower with respect to the others was subjected to temperature control. This resulted in the control system of the battery having a lower AH attempting to influence its temperature in one direction while the control system of all the other batteries in the battery system influenced their temperatures in the opposite direction. FIG. 9 shows the temperatures of each of the batteries. Curve 1 is the temperature of the variant (low AH) battery, while curve 2 is that of the others. In this model system, the remaining four batteries had the same initial AH, so their control mechanisms all operated identically with each other. The input to the system is real data. The reactions of the system to the input are simulated. The model can simulate the initial conditions of each of the elements. In practical applications, the batteries would become unbalanced with respect to each other after a service replacement, or after initial manufacturing, or after having sat idle for an extended period of time and where each of the parallel batteries self-discharged at a different rate.

With reference to FIG. 9, the temperatures initially were driven in different directions from each other for a significant period of time, then they hovered near each other as their AH's converged. This is consistent with the predicted behavior, namely, that a temperature decrease of the variant battery would decrease current flow from that cell, allowing it to rebalance against the remaining cells with higher energy. The resulting resistances of the batteries described in FIG. 9 are shown in FIG. 10. Curve 1 represents the resistivities of the variant battery, while curve 2 is that of the remaining batteries. Since the resistance is inversely proportional to the temperature, the plot of the battery resistances is almost a mirror image of that of the temperatures. The resistance variations drive the individual battery currents in the appropriate direction to achieve AH convergence.

FIG. 11 is a plot of the AHs of the variant battery and the remaining batteries described in FIG. 9. Initially, the variant battery has a lower AH as shown in curve 1. However, because its temperature is driven lower during the initial period of discharge, its AH grows with respect to the other batteries, where the other batteries are shown by curve 2. Once relative convergence is achieved, the temperatures are maintained relatively close to each other and the AH stays converged. Similar results occur when the variant battery's AH is initially set to 10% higher than the other batteries. FIG. 12 is a plot of the AH vs. time, in which the variant battery has a higher AH as shown in curve 3, but because its temperature is driven lower during the initial period of mostly discharging, its AH decreases with respect to the other batteries as shown by curve 4.

Other modifications and variations of the invention will be readily apparent to those of skill in the art in view of the teaching presented herein. For example, variations of the temperature controlling mechanism, thermostat functions, control functions, and programmed desired system behavior are contemplated.

In one or more embodiments, the system described above uses an air-cooling system to cool the batteries in order for the temperature to be controlled. The thermostat function controls the fan speed which increases cool air flow over the batteries which drive the temperature lower.

In one or more embodiments, the temperature control system employs a cooling liquid to be pumped around or near the batteries to remove heat from them, thereby reducing their temperature. In other embodiments, thermoelectric devices are used to drive heat away from the batteries using the principles and characteristic of thermoelectric devices, well-known to those skilled in the art of cooling. Other suitable means for temperature control include the use of heated air or heated liquid to augment the temperature rise required in certain modes, and not just relying on the internal heat generation of the batteries themselves. Another embodiment uses thermoelectric devices to drive heat into the batteries to augment the temperature rise required in certain modes, and not just relying on the internal heat generation of the batteries themselves.

In one or more embodiments, the temperature control system uses a linearly controlled amplifier circuit to control a fan speed signal which controls the battery temperature. In one or more embodiments, an ON/OFF type simple thermostat is used, which turns on fans for lower temperatures and turns off fans for higher temperatures. This system inputs a linear signal proportional or inversely proportional to temperature and compares it to another signal from the controlled battery proportional or inversely proportional to its temperature. This device outputs an electro-mechanical contact state which connects or disconnects two signals connected to the temperature controlling mechanism above, thereby causing the desired temperature influence to initiate in the original example or in the alternative embodiments.

Another embodiment employs a simple thermostat with output signals HEAT ON, COOL ON and ALL OFF. HEAT ON engages a system to apply heat to the batteries, COOL ON engages a system to cool the batteries, and ALL OFF engages neither, when neither is required. This system inputs a linear signal proportional or inversely proportional to temperature and compares it to another signal from the controlled battery proportional or inversely proportional to its temperature. This device outputs two electro-mechanical contact states which connects or disconnects two pairs of signals connected to the temperature controlling mechanism, thereby causing the desired temperature influence to initiate in the original example or in the alternative embodiments.

Another embodiment implements an exemplary linear system using electrical circuits with a combination of linear, analog and digital devices. This system inputs a linear signal proportional or inversely proportional to temperature and compares it to another signal from the controlled battery proportional or inversely proportional to its temperature. It outputs a linear signal proportional to the desired cooling effect in the original example or in the alternative embodiments.

Another embodiment is to implement an exemplary linear system using a programmable digital device such as microprocessor, FPGA or other similar devices, known well by those skilled in the art of control circuits. This system inputs a linear signal proportional or inversely proportional to temperature and compares it to another signal from the controlled battery proportional or inversely proportional to its temperature. It outputs a linear signal proportional to the desired cooling effect in the original example or in the alternative embodiments.

An ON/OFF type simple thermostat or a simple thermostat with output signals HEAT ON, COOL ON and ALL OFF signals can be implemented using an electromechanical mechanism. The electromechanical mechanism can be a coil spring having output electrical contact states that depend upon an input temperature value and mechanically set temperature demands instead of linear input signals representing temperature inputs. Alternatively, An ON/OFF type simple thermostat or a simple thermostat with output signals HEAT ON, COOL ON and ALL OFF signals can be implemented using a combination of analog and digital devices to interface between the linear temperature signals and the electromechanical contact states, or using a microprocessor or other programmable digital devices to interface between the linear temperature signals and the electromechanical contact states.

In one or more embodiments, an exemplary temperature control system uses a linearly controlled circuit to determine AH demand, current direction and finally to set the desired temperature and control the fan speed signal which ultimately controls the battery's relative AH.

In one or more embodiments, programmable digital devices such as a microprocessor or FPGA are employed to measure data, calculate, process and output the appropriate signal to control the temperature set point of the thermostat function.

In one or more embodiments, a combination of analog, linear and digital devices are employed to measure data, calculate, process and output the appropriate signal to control the temperature set point of the thermostat function.

Such programmable digital devices and/or analog, linear and digital devices can be used to actuate a mechanical position control that sets the temperature of a mechanical thermostat to actuate a linear signal that sets the temperature demand.

In one or more embodiments, the temperature control system controls the AH of each of the parallel batteries to converge to each other. In one or more embodiments, the temperature control system forces the current of each of the batteries to be the same regardless of AH or other conditions. In one or more embodiments, the temperature control system forces the current in a particular battery to be a ratio of the other batteries' currents depending on what the known capacity of the controlled battery relative is to the rest of the system. For example, one could shift larger current to a lithium ion battery and only begin to use a lead acid battery when the lithium ion battery is depleted. In one or more embodiments, the temperature control system forces the SOC of each of the batteries to be the same with respect to each other. In one or more embodiments, the temperature control system forces the SOC, e.g., about 35-50% SOC, of each of the batteries to a point at which is beneficial for its SOH or efficiency. In other embodiments, the temperature control system reduces the charging and discharging of one of the batteries if its SOH is more dependent on the WH throughput than the other batteries, or increases the charging and discharging of one of the batteries if its SOH is less dependent on the WH throughput than the other batteries.

Another embodiment is to control the temperature of each of the batteries independently to positively affect their individual efficiency, SOH, or performance.

The foregoing illustrates one specific embodiment of this invention. Other modifications and variations of the invention will be readily apparent to those of skill in the art in view of the teaching presented herein. The foregoing is intended as an illustration, but not a limitation, upon the practice of the invention. It is the following claims, including all equivalents, which define the scope of the invention.

What is claimed is:

1. A system for control of current in a parallel battery system, comprising:
    at least two parallel connected batteries, each said battery having an internal resistance and dissipating heat while charging and/or discharging;
    a temperature controller having a temperature control module coupled with each said battery, each temperature control module capable of independent operation for individually controlling the temperature of each said battery; and
    a system controller for receiving information from each said battery related to condition and performance of each said battery and for providing an output signal to each temperature control module to independently adjust the temperature of each said battery,
    wherein the independent adjustment of the temperature of each said battery is selected to maintain a target current value for each battery and for the entire parallel battery system.

2. The system of claim 1, wherein the temperature control system is selected from the group consisting of air cooling, liquid cooling, water cooling, thermoelectric cooling, air heating, liquid heating, and thermoelectric heating.

3. The system of claim 1, wherein the system controller is selected from the group consisting of a microprocessor or a field programmable gate array (FPGA).

4. The system of claim 1, wherein the system comprises a thermostat.

5. The system of claim 1, wherein the system controller is selected to receive information selected from the group consisting of voltage, current, temperature and combinations thereof.

6. The system of claim 1, wherein the system further includes a tool for evaluating a state of the battery system.

7. A method of controlling current in a parallel battery system, comprising:
    providing at least two parallel-connected batteries, each said battery having an internal resistance and dissipating heat while operating;
    during operation, measuring at least the temperature and current of each individual battery; and
    providing instructions to a temperature control system having a temperature control module coupled with each said battery for individually heating or cooling each said battery to adjust the temperature of at least one battery in order to maintain the current at a target value.

8. The method of claim 7, further comprising comparing the measured values of each said battery against a target value, said target value related to the state and/or performance of each said battery.

9. The method of claim 8, wherein the state of the battery is selected from the group of energy, ampere hours (AH), state of health (SOH) and state of charge (SOC).

10. The method of claim 7, wherein increasing dissipation of heat or lowering the temperature of the battery increases the current value for the battery.

11. The method of claim 7, wherein decreasing the dissipation of heat or raising the temperature of the battery decreases the current value for the battery.

12. The method of claim 7, wherein the temperature control system controls the AH of each of the parallel batteries to converge to each other.

13. The method of claim 7, wherein the temperature control system adjusts the current value of each of the batteries to be the same regardless of AH.

14. The method of claim 7, wherein the temperature control system adjusts the current value for a particular battery to be a ratio of the other batteries' current values depending on what the known capacity of the particular battery is relative to the rest of the batteries within the parallel battery system.

15. The method of claim 7, wherein the temperature control system adjusts the SOC of each of the batteries to be the same.

16. The method of claim 7, wherein the temperature control system reduces the charging and discharging of a particular battery within the parallel battery system if the SOH of the particular battery is more dependent on the watt hours (WH) throughput than the other batteries in the parallel battery system.

17. The method of claim 7, wherein the temperature control system increases the charging and discharging of a particular battery within the parallel battery system if the SOH of the particular battery is less dependent on the watt hours (WH) throughput than the other batteries in the parallel battery system.

* * * * *